US012567021B2

(12) United States Patent
Bhalodia et al.

(10) Patent No.: US 12,567,021 B2
(45) Date of Patent: Mar. 3, 2026

(54) REMOTE CONTROL OF ARTICLE BASED ON ARTICLE AUTHENTICATION

(71) Applicant: InstrumentMail, LLC, San Francisco, CA (US)

(72) Inventors: Vimal Bhalodia, East Hanover, NJ (US); Robb Walters, San Francisco, CA (US); Stuart Alexander Jacobson, San Francisco, CA (US)

(73) Assignee: InstrumentMail, LLC, San Francisco, CA (US)

( * ) Notice: Subject to any disclaimer, the term of this patent is extended or adjusted under 35 U.S.C. 154(b) by 0 days.

(21) Appl. No.: 18/504,938

(22) Filed: Nov. 8, 2023

(65) Prior Publication Data

US 2024/0257033 A1      Aug. 1, 2024

Related U.S. Application Data

(63) Continuation of application No. 16/923,713, filed on Jul. 8, 2020, now Pat. No. 11,853,954, which is a (Continued)

(51) Int. Cl.
G06Q 10/0833 (2023.01)
G06Q 10/0832 (2023.01)
(Continued)

(52) U.S. Cl.
CPC ..... G06Q 10/0833 (2013.01); G06Q 10/0832 (2013.01); G06Q 20/14 (2013.01);
(Continued)

(58) Field of Classification Search
CPC ............. G06Q 10/083; G06Q 10/0832; G06Q 10/0833; G06Q 10/0385; G06Q 10/0837; G06Q 10/0838
See application file for complete search history.

(56) References Cited

U.S. PATENT DOCUMENTS 8,533,075 B1     9/2013  Sayers, III et al.
10,074,247 B1    9/2018  Tang et al.
(Continued)

FOREIGN PATENT DOCUMENTS

GB          2483474 A       3/2012
WO     WO-2011096813 A1 *   8/2011    ............. E05B 47/00

OTHER PUBLICATIONS

Jedermann, Reiner, Luis Ruiz-Garcia, and Walter Lang. "Spatial temperature profiling by semi-passive RFID loggers for perishable food transportation." Computers and electronics in Agriculture 65.2 (2009): 145-154. (Year: 2009).*

(Continued)

*Primary Examiner* — Emmett K. Walsh
(74) *Attorney, Agent, or Firm* — Polsinelli PC

(57) ABSTRACT

Systems and methods for remotely controlling an article based on authentication of the article. A communication system with a senor for detecting an interaction event can be coupled to an article. The communication system can be associated with an article identifier. A communication including the article identifier can be received and the identification of the article through the article identifier can be authenticated based on an association of the article identifier with the communication system to verify that the communication is generated in response to the interaction event occurring at the article and being detected by the sensor of the communication system. As follows, operation of the article can be remotely controlled based on whether the article is authenticated.

20 Claims, 10 Drawing Sheets

Related U.S. Application Data continuation of application No. 14/793,485, filed on Jul. 7, 2015, now abandoned, which is a continuation-in-part of application No. 14/639,983, filed on Mar. 5, 2015, now abandoned.

(60) Provisional application No. 61/949,935, filed on Mar. 7, 2014, provisional application No. 62/040,966, filed on Aug. 22, 2014.

(51) Int. Cl.

| | |
|---|---|
| *G06Q 20/14* | (2012.01) |
| *G06Q 20/40* | (2012.01) |
| *G06Q 30/06* | (2023.01) |
| *G06Q 30/0601* | (2023.01) |
| *G08C 17/02* | (2006.01) |
| *H04W 4/029* | (2018.01) |
| *H04W 12/06* | (2021.01) |
| *H04W 4/23* | (2018.01) |

(52) U.S. Cl.

CPC ............. *G06Q 20/40* (2013.01); *G06Q 30/06* (2013.01); *G06Q 30/0605* (2013.01); *G08C 17/02* (2013.01); *H04W 4/029* (2018.02); *H04W 12/06* (2013.01); *G08C 2201/20* (2013.01); *G08C 2201/60* (2013.01); *H04W 4/23* (2018.02); *Y02D 30/70* (2020.08)

(56) References Cited

U.S. PATENT DOCUMENTS

| | | | |
|---|---|---|---|
| 2003/0212768 | A1 | 11/2003 | Sullivan |
| 2005/0236479 | A1 | 10/2005 | Schmidtberg et al. |
| 2006/0125642 | A1 | 6/2006 | Chandaria |
| 2007/0115128 | A1 | 5/2007 | Napolitano |
| 2007/0241889 | A1 | 10/2007 | Kopp |
| 2008/0007398 | A1 | 1/2008 | DeRose et al. |
| 2008/0186163 | A1 | 8/2008 | Mills |
| 2009/0096611 | A1 | 4/2009 | Jones |
| 2009/0228343 | A1 | 9/2009 | Ford et al. |
| 2009/0309722 | A1 | 12/2009 | Nichols et al. |
| 2009/0315765 | A1 | 12/2009 | Chen |
| 2010/0176919 | A1 | 7/2010 | Myers et al. |
| 2011/0022533 | A1 | 1/2011 | Lau et al. |
| 2011/0050423 | A1 | 3/2011 | Cova et al. |
| 2011/0077909 | A1 | 3/2011 | Gregory et al. |
| 2011/0145162 | A1 | 6/2011 | Vock et al. |
| 2011/0231236 | A1 | 9/2011 | Gonzalez |
| 2012/0023555 | A1 | 1/2012 | Putterman |
| 2012/0259920 | A1 | 10/2012 | Mathieu et al. |
| 2012/0315955 | A1 | 12/2012 | Chandaria |
| 2013/0048717 | A1 | 2/2013 | Brendell et al. |
| 2013/0110534 | A1* | 5/2013 | Iasella .................... G06Q 10/10 705/2 |
| 2013/0135083 | A1 | 5/2013 | Chang et al. |
| 2013/0151434 | A1 | 6/2013 | Chandaria |
| 2013/0194926 | A1 | 8/2013 | DeCusatis et al. |
| 2013/0222116 | A1 | 8/2013 | Barry, III |
| 2013/0324148 | A1 | 12/2013 | Geib et al. |
| 2014/0018100 | A1 | 1/2014 | Yamada et al. |
| 2014/0058560 | A1 | 2/2014 | Kanagala |
| 2014/0279596 | A1 | 9/2014 | Waris et al. |
| 2014/0288868 | A1 | 9/2014 | Gorham |
| 2014/0297487 | A1* | 10/2014 | Bashkin ................. H04N 23/90 705/28 |
| 2014/0302842 | A1 | 10/2014 | Lloyd et al. |
| 2015/0012457 | A1 | 1/2015 | Gonzalez et al. |
| 2015/0039267 | A1* | 2/2015 | Busch ...................... G07C 5/08 702/182 |
| 2015/0046364 | A1 | 2/2015 | Kriss |
| 2015/0055686 | A1 | 2/2015 | Hryciuk et al. |
| 2015/0100514 | A1 | 4/2015 | Parris |
| 2015/0112785 | A1 | 4/2015 | Sharan |
| 2015/0189504 | A1 | 7/2015 | Chew |
| 2015/0255111 | A1 | 9/2015 | Grasso |
| 2015/0269518 | A1 | 9/2015 | Gray |
| 2015/0359127 | A1 | 12/2015 | Daoura et al. |

OTHER PUBLICATIONS

Svadlenka, Libor; "RFID in Postal and Courier Services"; University of Pardubice, The Jan Perner Transport Fakulty, Department of Transport Management; pp. 68-74; 2006.

* cited by examiner

Detect Event at Device — 402

Device Contacts the Communications Server Via the Telecommunications Network — 404

Authenticate Device ID Against Local Device Identification Database — 406

Device Authenticated? — 407

No → Drop Communication — 410

Yes → Establish Communication with Device — 408

REMOTE CONTROL OF ARTICLE BASED ON ARTICLE AUTHENTICATION

CROSS REFERENCE TO RELATED APPLICATIONS

This application is a continuation of U.S. application Ser. No. 16/923,713, filed Jul. 8, 2020, which is a continuation of U.S. application Ser. No. 14/793,485, filed Jul. 7, 2015, which is a Continuation-in-Part of U.S. application Ser. No. 14/639,983, filed Mar. 5, 2015, which claims priority under 35 U.S.C. § 119(e) to U.S. Provisional Patent Application No. 61/949,935, filed Mar. 7, 2014, and to U.S. Provisional Patent Application No. 62/040,966, filed Aug. 8, 2014, all of which are incorporated by reference herein in their entireties.

BACKGROUND

1) Technical Field

The present technology relates to the field of networking and consumer electronics, and more specifically, to systems and methods for remotely controlling operation of an article based on authentication of the article.

2) Introduction

Presently, tracking events remotely involves humans manually notating that n event occurred. For example, a receptionist can sign for a package and the courier can send a confirmation to the sender of the package that the package was received. However, the sender never actually knows that the package was opened. Likewise, consumer goods (e.g. medicine containers, tires, light bulbs, etc.) are passive and require a human to report that they need replacement or servicing. More advanced systems and methods are required to detect events at remote locations.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting events at remote locations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

1) Overview

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The present disclosure addresses the need in the art for more advanced approaches for detecting events at remote locations. Systems, methods, and computer-readable media are disclosed which detect events occurring to an article at a remote location. The technology can involve integrating communication interface within an article. The communication interface can include memory, a power source, a sensor for detecting an interaction event with the article, a processor coupled with the sensor, and a communication interface coupled with the processor. The communication interface can be associated with one or more telecommunication networks (cellular network, mobile virtual network operator network (MVNO), pager network, long range radio network, ad-hoc event detection network, etc.) and can be associated with one or more identifiers such as a network identifier, an article identifier, etc.

When the article is sent to a remote location and the sensor detects a trigger event (e.g., opening the article, detecting a threshold luminosity, detecting a threshold pressure) the communication interface can send a message over the telecommunication network that includes the network identifier, the article identifier, and location information (e.g., GPS coordinates, cell tower location, etc). Various actions can be configured to occur in response to the detected event.

In the following description, for the purposes of explanation, numerous specific details are set forth in order to provide a thorough understanding of the present technology. It will be apparent, however, that the present technology can be practiced without these specific details. In other instances, well-known structures and devices are shown in block diagram form in order to avoid unnecessarily obscuring the present technology.

2) Physical Description

Figure 1:
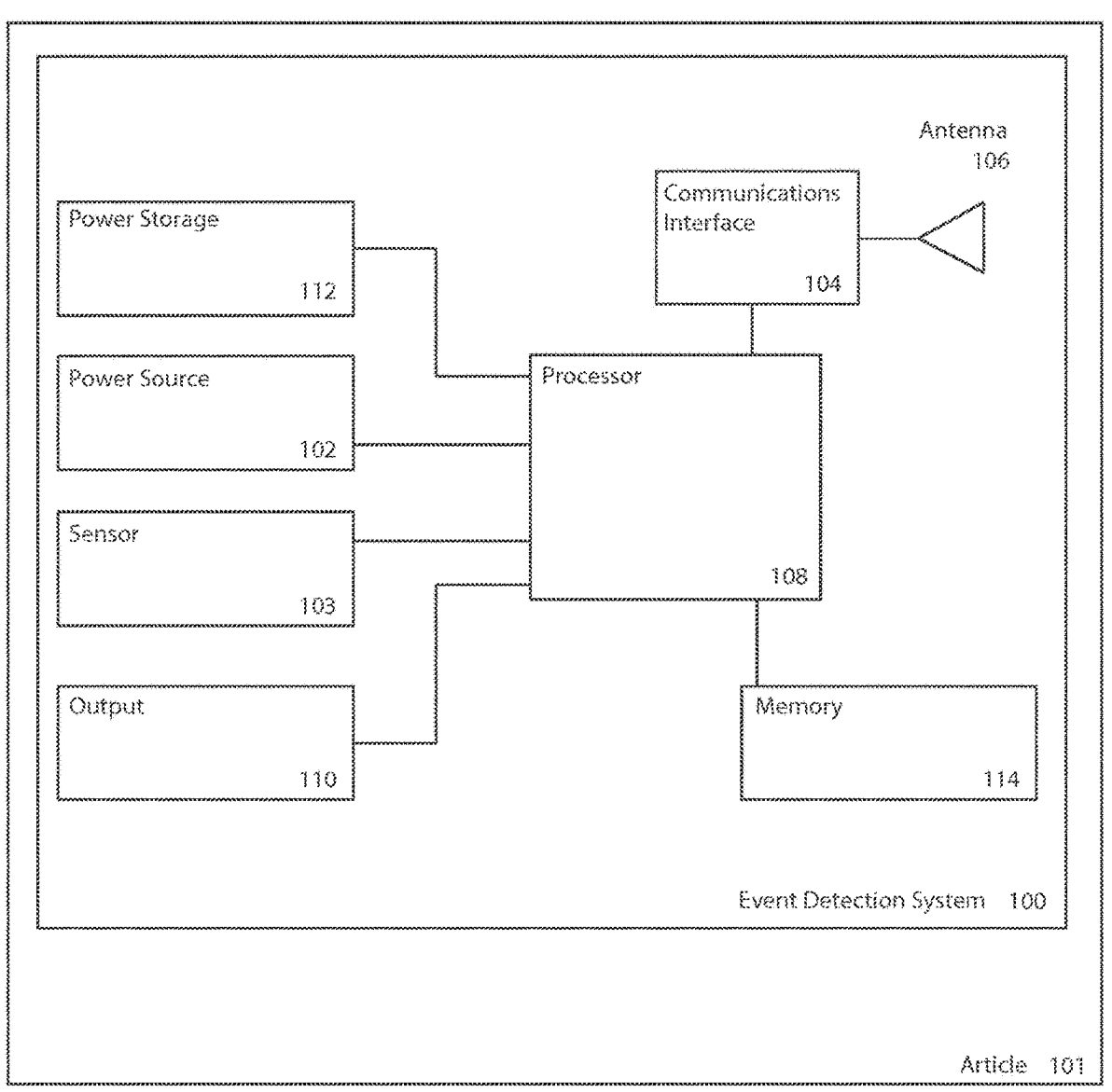
FIG. 1 schematically illustrates an event detection and remote communications device embedded in an article, in accordance with some embodiments of the present technology.

FIG. 1 illustrates an event detection system 100 for providing event detection data relating to an article over a network according to some embodiments of the present technology. The event detection system 100 can be coupled with an article 101. Example articles include articles, envelopes, paper, books, magazines, shipping articles, article wrapping, gift wrapping, consumable items, price tags, price labels, theft-deterrent devices, inhalers, tires, clothing material, clothing tags, clothing labels, computing devices, consumer devices (such as an LEDs or other light-emitting fixtures), disposables (such as bottles or other containers for food products, liquids, toiletries, or other replenishables/perishables), off-the-shelf sensors (such as temperature sensors or light sensors), automotive goods (such as tires, batteries, and auto parts), or any portable object.

The event detection system 100 can also include a power source 102, a sensor 103, a communication interface 104, an antenna 106, a microprocessor 108, and memory. The event detection system 100 can also include power storage 112, and an output 110. The components of the event detection system 100 shown in FIG. 1 and similar components are explained in more detail below.

a) Housing

In some embodiments, the event detection system 100 can be housed on a substrate or within one or more substrates. The substrates can be attached to or enclosed within articles or other consumer articles. The substrates can be distinct from the articles and can be integrated within the articles. Examples of articles on which the event detection system 100 could be attached include paper-based articles such as envelopes, printed materials such as menus, or packaging such as pizza boxes. A variety of other articles and consumer articles can be benefit from the present technology and a number of types of articles are mentioned explicitly in this disclosure. However, those with ordinary skill in the art having the benefit of this disclosure will readily appreciate that a wide variety of articles can be used with the present technology.

In some embodiments, the event detection system 100 is implemented in one or more integrated circuits, which can include silicon-based integrated circuits, and in which the event detection system 100 can be attached to the articles via an adherent. The event detection system 100 can be enclosed within the article, such as an envelope or pizza box. In some embodiments, the electronics comprising the event detection system 100 can be deposited, in whole or in part, on the medium of the article itself. For instance, the components of the event detection system 100 can be instantiated directly on a paper-based medium, such as an envelope or cardboard box.

In some embodiments of the present technology, the event detection system 100 is substantially visually indistinguishable from the medium in which it is embedded or attached. For example, when the event detection system 100 attached to or embedded in a paper envelope, the event detection system 100 can be visually indistinguishable to viewers from the paper of the envelope. It will be understood by those skilled in the art that the technology can be practiced on media that are durable rather than disposable, and that in alternative embodiments of the present technology, the features of the present technology described herein are implemented in durable materials, substrates, or other non-disposable media. In some embodiments, the event detection system 100 is attached to an article that is shippable; shippable meaning an item designed to be sent through a delivery service (e.g., an envelope, letter, postcard, package).

b) Power

As explained above, the event detection system 100 can include a power source 102. In some embodiments of the technology, the power source 102 is an ambient power source, which receives and converts energy from the surrounding environment. For example, the ambient power source can be a photo-voltaic detector. In other embodiments, the power source 102 can obtain energy from radio waves or other electromagnetic spectrum. Ambient energy sources can include inductive power sources, such as those powering RFID readers.

Also, some embodiments of the present technology can involve using thermal power, such as from body heat, or ambient kinetic energy, such as from the motion of a user or recipient of the article. Alternative forms of ambient energy that can be utilized to supply power to the event detection system 100 will be apparent to those skilled in the art. Ambient light can also be used with the power source.

In some embodiments, the power source 102 can be a lightweight battery. Certain some embodiments can utilize a capacitor for energy storage. For example, a supercapacitor can be utilized. In some embodiments, the capacitors or battery can be on a separate substrate from the event detection system; in other embodiments, the capacitor or battery can be implemented within the physical medium of the event detection system, such as in paper on a paper-based article.

In other embodiments, there is no battery or power storage in the event detection system, and all power is received through ambient sources. Some embodiments of the present technology include power storage 112 that is separate from the power source; in some such embodiments, the power storage 112 collects power from a power source 102 from time-to-time, or on a periodic basis.

In some embodiments of the present technology, the power source 102 is utilized to provide a signal of an event to the event detection system 100, as described further in other sections of this written description. In some embodiments of the present technology, the power source 102 is charged prior to delivery of the event detection system 100, so that the event detection system 100 is operable immediately without requiring power from an external source for initial communications to be conducted via the communication interface 104.

c) Communication Interface

The event detection system 100 can include a communication interface 104. In some embodiments of the present technology, the communication interface 104 communicates over a long-distance wireless telecommunications system. For example, the wireless telecommunications system can be a pager network. In some embodiments of the present technology, the telecommunications system does not require a SIM card or other similar local network identifier to be included in the event detection system 100. Also, the wireless telecommunications system can be a cellular network, such as a TDMA, CDMA, LTE or GSM network. Other alternative wireless telecommunications systems that can be utilized with the present technology will be apparent to those skilled in the art. Additionally, the communication interface 104 can communicate over a wireless local area network (e.g., 802.11 protocol). Other alternative wireless network systems that can be utilized with the present technology will be apparent to those skilled in the art.

In some embodiments, the communication interface 104 can include systems to communicate within close proximity to other devices, such as Near Field Communications (NFC), Bluetooth, or radio frequency identification (RFID) systems; other such systems for proximate communications will be apparent to those skilled in the art. The communication interface 104 can include an antenna 106. In certain some embodiments, the antenna 106 can be a strip line antenna; in certain some embodiments, the antenna can be printed on the same medium as the article, such as paper. In some embodiments, the communication interface 104 can include a Subscriber Identity Module (SIM) circuit. In some embodiments, the antenna 106 provides energy to the power source 102. In some embodiments, the communication interface 104 operates at the voltages provided by the power source 102.

In some embodiments of the present technology, the communication interface 104 is configured to be relatively dormant until the occurrence of an interaction event; at which time the communication interface 104 can send a message related to the interaction event. For example, the communication interface 104 can be configured to not periodically "ping" the communications network until the event. Also, the communication interface 104 can be configured so that a message stored in memory 114 and only sent by the communication interface 104 once sufficient power is obtained in the power source 102 or power storage 112 to enable delivery of the message to the communications server 202 via the telecommunications system 200.

In some embodiments of the present technology, at the time that article is deployed, bandwidth can be purchased from the providers of a telecommunications service, in order to allow the article communicate via the telecommunications system 200 automatically, for a minimum or perpetual subscription period. Alternatively, such connectivity can be purchased from the providers of the telecommunications system 200 in batches, allowing communication from the articles for limited periods of time.

In some embodiments of the present technology, one or more event detection systems 100 are utilized as a virtual local area network. In some such embodiments, each system constitutes a modem that can be attached to, or constitutes part of, hardware that would otherwise be connected to a local area network, such as a server, laptop computer, printer, router, desktop PC, etc. In some such embodiments, all communications amongst such machines, via a local networking protocol, or communications between such machines and the Internet, are conducted through the communication interface 104; in some such embodiments, the local communication packets are encapsulated in the communications via the communication interface 104.

In some such embodiments, the systems can also be coupled via a local mesh or other local network, where such local network is utilized solely for communications within the nodes on the network, and not for Internet communications.

In some embodiments, a local device serves as a bridge to the communications and/or operating servers. For example, the event detection system 100 can communicate via a short-range wireless signal to a device that then retransmits the information to the communications and/or operating servers.

d) Processor and Memory

In some embodiments, the event detection system 100 includes a processor 108, which is operable under the power provided by the power source 102 or power storage 112. In some embodiments, the processor 108 is a low power microcontroller. For example, the processor 108 can constitute an 8-bit processor; however, in other cases, higher-bit processors can be utilized. The processor 108 can be operable at a power and voltage that can be supplied by the power source 102. In some such embodiments, the processor 108 is in communication with solid state, low-power non-volatile memory 114 that can be embedded on the substrate, and that is operable at the power and voltage that can be supplied by the power source 102. The non-volatile memory 114 can in some embodiments, be readable, programmable, or read/writeable. Suitable forms of non-volatile memory 114 will be apparent to those skilled in the art. In some embodiments of the present technology, the digital components of the event detection system 100 are coupled over one or more communications buses; in some such embodiments, such one or more communications buses can be embedded in a common substrate with other components of the event detection system 100.

e) Outputs

In some embodiments of the present technology, the event detection system 100 includes an output 110 in communication with the processor 108, which can be activated in response to commands received from the processor 108. For example, the output 110 can be an LED attached to the event detection system 100. The LED can be Organic LEDs (OLEDs) or quantum dots. In some embodiments, the output 110 is a motor or other physical actuator.

In some embodiments, the output 110 can be a small, lightweight display, such as a liquid crystal display. In some such embodiments, the display can be utilized to display a code, such as a QR code. In some embodiments, the output 110 can be a speaker. In some such embodiments, the speaker can be utilized to issue an audible or inaudible sound that identifies the event detection system 100 or article 101.

In some embodiments, the output 110 can also act as sensors 103; in some such embodiments, a speaker 110 can also be utilized as a microphone that provides input to the sensor 103/110, which translates the analog signal of the microphone into a digital signal for the processor 108. Other outputs 110 will be apparent to those skilled in the art. In some embodiments, the event detection system includes an output 110, but no sensor 103; in some such embodiments, the output 110 is responsive to signals received by the processor 108 via the communication interface 104.

3) Sensors

The sensors 103 that can be present in the event detection system 100 can comprise a variety of components and forms. As discussed above, the output mechanism can double as a sensor (e.g., a speaker as a microphone). Sensors 103 can also comprise a photo-diode, a humidity sensor, accelerometer(s), gyroscope(s), and buttons. In some embodiments, the sensors 103 are integrated into the article 101 so as to not be visible by the user. Various sensors and inputs are described herein.

In some embodiments, the sensor 103 is a sensor unit with an integrated processor that is communicatively connected to the processor 108.

4) Network

Figure 2:
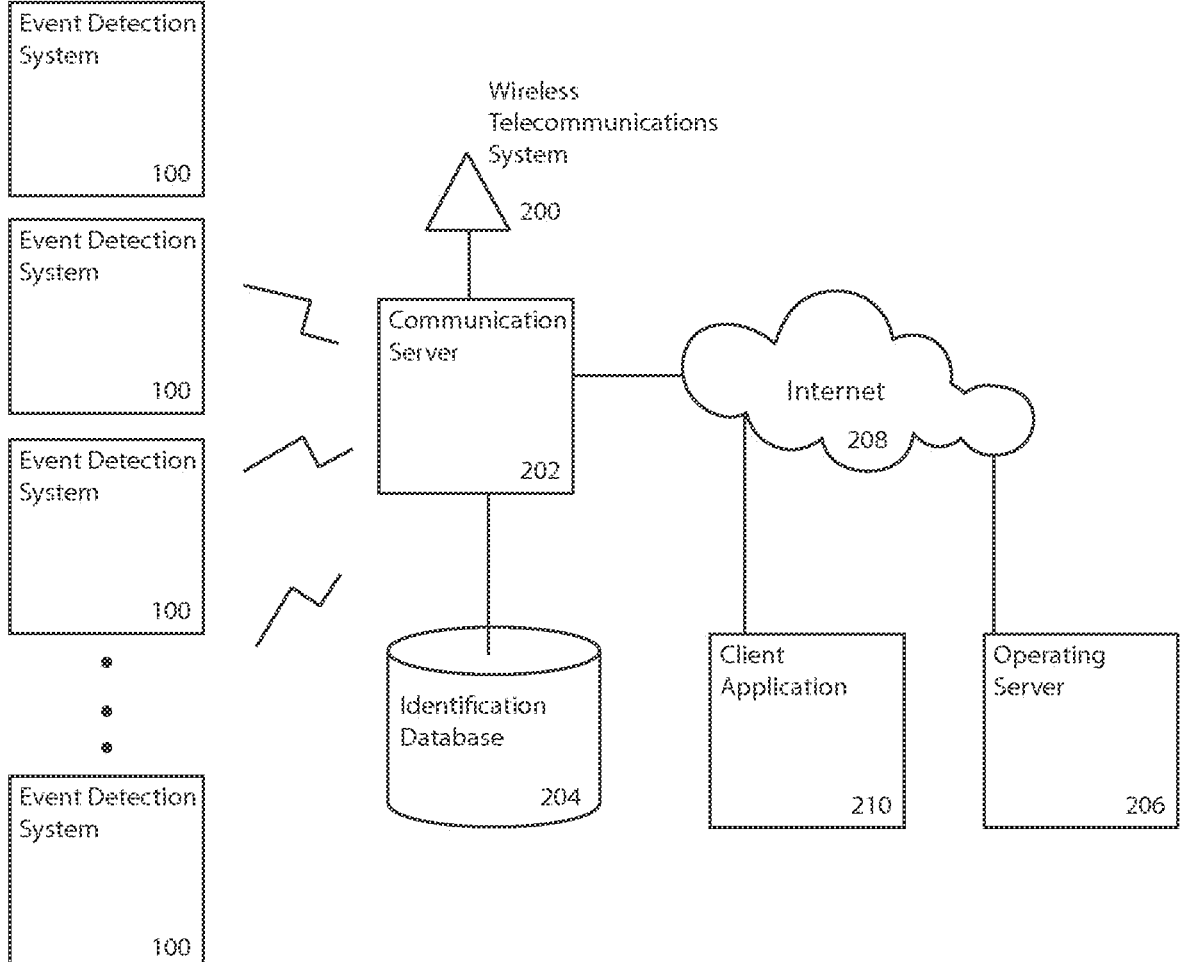
FIG. 2 illustrates network architecture for remote detection and operation of the article, in accordance with some embodiments of the present technology.
Figure 3:
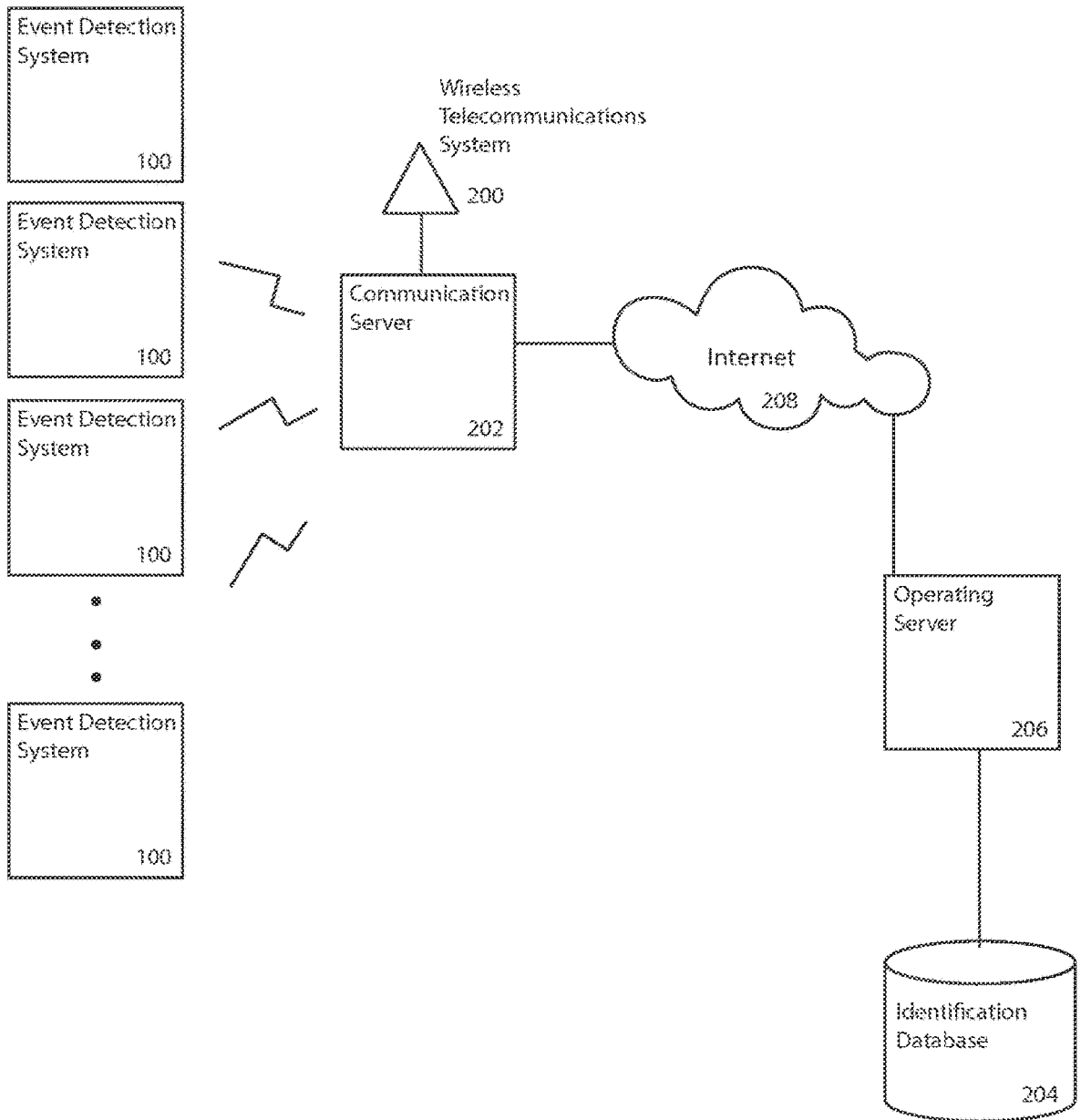
FIG. 3 illustrates network architecture for remote detection and operation of the article, in accordance with some embodiments of the present technology.

FIGS. 2 and 3 illustrate examples of communications networks used for remote interaction with articles containing event detection systems according to some embodiments of the present technology.

In some embodiments, the communication interface 104 can be "loaded" with "pre-paid minutes" to permit any anticipated communication over its lifetime. For example, if the article were a light source, the light source is provisioned prior to delivery to the user with sufficient call-time to exchange messages via a wireless telecommunications network for the expected life of the product.

a) Network Topology

As shown in FIGS. 2 and 3, multiple articles 299 containing event detection systems can communicate over long-distances over a long-range wireless communications system 200. For example, the wireless communications system 200 can be a pager network, a cellular network, or other wireless communications system, which is communicable via a lower power system, as discussed above. In some embodiments of the present technology, the wireless communications system 200 can include two or more wireless networks from different telecommunications services providers. For example, different telecommunications services providers and networks can be utilized for communications with the article 299 if the article 299 moves in and out of coverage, roams between networks, etc.

In some embodiments, the wireless communications system 200 can lease existing networks/radio towers, install new towers specific to the system 200, or a combination of both.

In some embodiments, the wireless communications interface 104 is configured to communicate over a short distance to a base station. The base station then transmits the data from the wireless communication interface to a communications server or operating server. This transmission can be over the internet or through a direct connection. This can enable a hybrid communication system whereby the wireless communication interface 104 can communicate via one wireless protocol and the base station can communicate via another protocol. The base station can connect to a more powerful power source for greater range. In some embodiments, the base station appends a base station identifier, geolocation data, and reception connection quality to data that is communicated to the communications server or operating server. The base station can actively detect devices that are within a communication range.

In some embodiments, the event detection system can connect to an access point over a low bandwidth and low power connection. The access point can then route the information from the event detection system to the operating server.

b) Communication Server

In some embodiments of the present technology, an article 299 can communicate with one or more communications servers 202. In some such embodiments the communications servers 202 are configured to identify one or more network/article identifiers via an identification database 204 coupled locally to the communications servers 202. In some embodiments, as depicted in FIG. 3, the identification database 204 is remote from the communications servers 202.

In some embodiments, the communications servers 202 include protocol gateways for transforming messages received via the wireless communications system 200 to a packet based protocol for further distribution over the wide area network 208, as described below.

In some embodiments, the event detection system 100 sends a "heartbeat" to the communication server to indicate its status.

In some embodiments of the present technology, the identification database 204 maps network identifiers to the one or more articles. In some embodiments, the identification database also records one or more individuals, through a user identifier, associated with an article. In some embodiments, other personally identifying information can be included in the identification database 204, such as a postal address for the user to which an article is sent. Other examples of user or article information that can be stored in the identification database 204 shall be apparent to those skilled in the art.

The identification database can be an SQL database, a flat file, a CSV, or, distributed file system, etc. In certain some embodiments, the identification database stores records in encrypted format. In some such embodiments, the encrypted records are only accessible by a user associated with the article. In certain some embodiments, the user can access the identification database 204 via a web browser or other client application 210 in communication with the identification database 204 via the wide area network 208. In some embodiments, the client application 210 can be a mobile application that operates on a smartphone, tablet, or other mobile computing device. In some such embodiments, communication between the client 210 and the identification database 204 is over a secure protocol, such as, by way of example but not limitation, Secure Socket Layer; other suitable secure protocols will be readily apparent to those skilled in the art. In some embodiments, the identification database 204 and client 210 are configured to allow the user to set up a password unique to the user, which is required for operating the articles remotely.

c) Operating Server

Embodiments of the present technology include one or more operating servers 206 for interacting with the articles 299; such interactions can include monitoring and/or operating the articles 299. Although it is mentioned that these communications occur with articles 299, such communication may be directed at a corresponding event detection system. In some embodiments of the present technology, the operating servers 206 are in communication with the communications servers 202 via a wide area network 208, such as the Internet. Also, communications between the operating servers 206 and the articles 299 can be sent over a packet-switched protocol, such as or TCP/IP or UDP. In some embodiments, the packet-switched protocol is IPv4 or IPv6. Other packet-switched protocols that can be utilized for communications between the articles 299 and the operating services 206 shall be apparent to those skilled in the art. In some embodiments, the one or more operating servers 206 are in direct communication with the device identification database 204.

When communications between the operating server 206 and the event detection system 100 are held over secure communication sessions, such communications will not be transparent to the telecommunications services provider.

d) Identifiers

The operating server and communication server keeps track of event detection systems, articles, and users by means of associated identifiers.

The identifiers can be distinct. The identifiers can be sequentially or randomly allocated. Having relatively large, randomly allocated identifiers can help prevent unauthorized parties from brute-force guessing a network identifier.

In certain some embodiments, identifiers can include several more bits than necessary to uniquely identify the event detection system/article/user, for purposes of security and/or error correction. In some such embodiments, the bits in the identifier are randomized. In some embodiments, a plurality of event detection systems 100 on a single article include a common string in the network identifier, to indicate that such event detection systems 100 belong on a single article. In certain some embodiments, the network identifier includes error correction, such as forward error correction, Hamming codes, or Reed-Solomon codes. Other methods of error correction or redundancy that can be applied to the network identifiers shall be readily apparent to those skilled in the art. In certain some embodiments, the event detection system 100 can be communicated with by the operating server 206 via email, SMS, Twitter, or other text-based messaging systems. In some embodiments, the event detection system 100 is associated with a public key, for encrypting and authenticating keys.

Network Identifiers

Each individual event detection system 100 can have its own network identifier. The network identifier can be associated with the communication interface of the event detection system. The network identifiers can include an identifier on the telecommunications network, such as a telephone number. In some embodiments, the one or more network identifiers can include an identifier such as an IP address (such as an IPV4 or IPV6 address), a MAC address, or a universally unique identifier (UUID). Other examples of network identifiers associated with the articles will be apparent to those skilled in the art.

Article Identifiers

In some embodiments, an article can have an article identifier. An article can be associated with one or more event detection systems and thus can be associated with one or more network identifiers. For example, an envelope can have two or more event detection systems 100, each of which has a different network identifier. Alternatively, the event detection systems within the envelope can be assigned the same network identifier. The network identifier can inherit the article identifier or vice versa. In some embodiments, the event detection systems 100 are authenticated to the communications server 202 only if all event detection systems 100 on the device report the same identifier.

User Identifiers

In some embodiments, a user has a user identifier. A user identifier can be any data that is associated with the user. The user identifier can be unique such as a username, social security number, email address, etc.; alternatively, the user identifier can be descriptive such as a given name, birthday etc. Although the term "user" is used, it should be understood that "user" can refer to any human being that is associated with an article. In some embodiments, the "user" is not the only person interacting with the article.

In some embodiments, a network/article identifier is associated with one party while another party is given access. For example, a doctor can access the data generated by an event detection system 100 associated with a patient to ensure the patient is following a prescribed pill regime.

e) Associating Identifiers

Network, article, and user identifiers can be associated with each other in a variety of configurations. Example methods and systems for associating identifiers are discussed below.

In some embodiments of the present technology, the network identifier is loaded on to the communication interface 104 at the time the article is assigned. For example, the identifier can be loaded in a SIM circuit in the communication interface 104. The telecommunications provider can route traffic between the article and the article operating servers 206 that are operated by or on behalf of the issuer of the article, based on the network identifier for the article.

Figure 9:
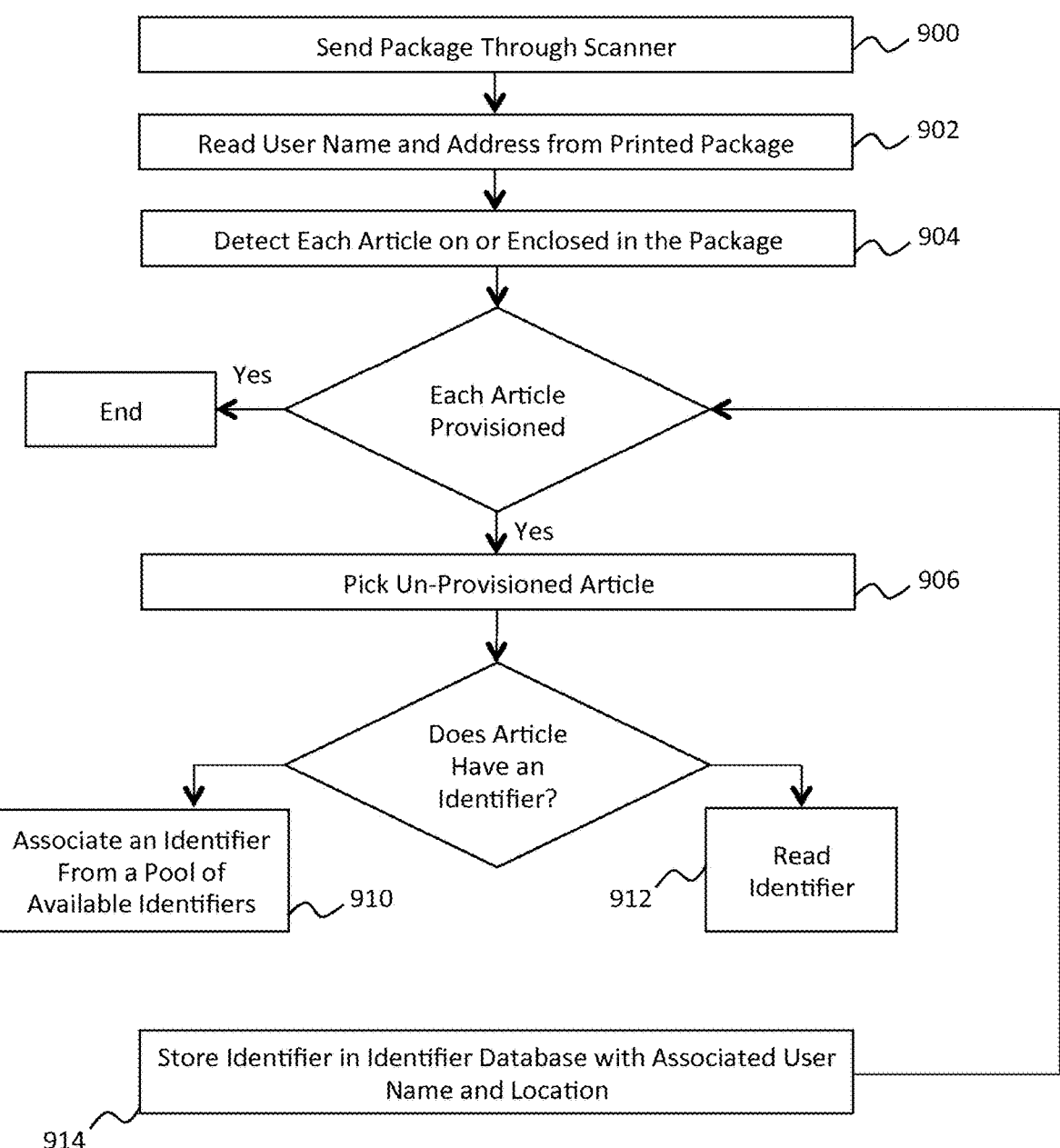
FIG. 9 is a flow chart for assigning network identifiers to articles in accordance with some embodiments of the present technology.

In some embodiments, the article identification database 204 is populated at the time the article is assigned. In some embodiments, as depicted in the flowchart in FIG. 9, at the time of assigning, the article is sent 900 through an automated process whereby information printed on the article is read 902. For example, a reader reads such printed information via optical scanning. The printed information can be a name of an intended recipient of the article and a delivery address for the article. Thereafter, the articles that are enclosed in or attached to the article are detected 904. For any article that has not been assigned in an article identification database 906, the article is read to see if it has an identifier encoded 908.

If not, an article identifier is selected from a pool of available identifiers and loaded onto the article 910. If there is an identifier on the article, that article identifier can be retrieved 912 and stored in the article identification database 204 along with a user identifier and the associated name and location of the intended article recipient 914.

In alternative embodiments, as will be apparent to those skilled in the art, the steps in the foregoing process can be conducted concurrently or in alternative orders. By way of example but not limitation, the article can be detected initially, with the label/delivery address placed on the article based on the identifier of the article. In other embodiments, the article is not scanned, but the article identifier can be known by virtue of an order in which the article was sent through the process. In some embodiments, the article can be initiated through the process without an identifier for the article or an article label, and both can be assigned to the article and its applicable article concurrently. Other variants will be apparent to those skilled in the art.

In some embodiments of the present technology, an event detection system 100 is assigned prior to delivery of an article to the end user. In some such embodiments, a device scans an address on the article at the time it is assigned. This can include scanning a printed address via optical character recognition, scanning a bar code, QR code, or other such printed code on the article, and/or detection of the event detection system 100 via electronic communication, such as, by way of example but not limitation, via Near Field Communication. In some such embodiments, the machines update the article identifier database to couple the postal/physical delivery address on the article 101 (or other such identification of the article 101 as can be printed on the article 101 or indicated in the bar code, QR code, or other such code) with an article and/or user identifier in an article identifier database. Other mechanisms for correlating printed information on the article 101 with article identifiers or other information regarding the user or article will be apparent to those skilled in the art. In some embodiments, such separate articles can be operable to adhere and/or enclose the event detection system 100 particular positions on an article, for conformance with design specifications for the article, or to place articles in communication with corresponding icons on the article.

In some embodiments, when the event detection system 100 is created, it is provisioned a network identifier. Alternatively, the event detection system 100 can be shipped "blank" and can then be provisioned a network identifier while with an intermediary. As another alternative, the event detection system 100 can be provisioned a network identifier upon receipt by the intended user or destination.

In some embodiments the creator of event detection system 100 can assign each event detection system 100 to a user upon creation. For example, the creator can provision the event detection system 100 with an ID provided by the user. Alternatively, the creator can provision a network identifier to the event detection system 100 and then associate the user (or user identifier) with the network identifier. In some embodiments, after the network identifier is assigned, such information can be programmed or affixed to the event detection system 100.

In some embodiments, an intermediary receives the event detection system 100 and then assigns it to a user. In some embodiments, the intermediary associates an event detection system 100 with an article. The intermediary can be a store or reseller. A network identifier can be already placed in the event detection system 100 and the store, upon sale, can associate the network identifier with an end user.

In some embodiments, the intermediary can repurpose event detection system 100s that have been previously assigned. Repurposing can entail relabeling, reflashing, or otherwise reassigning a network identifier to an event detection system 100. Repurposing can also include assigning a network identifier to a new end user.

Another example embodiment is a pill container being supplied by a pharmacy. The pharmacy can read the network identifier from the event detection system 100 contained within the pill container and then assign that network identifier to the patient. This would enable the event detection system 100 to monitor the patient's self-administration of the pills and report.

In some embodiments, this assignment occurs at "checkout." This checkout configuration can happen without extra interaction. For example, a system can take the registration information of the purchaser and associate the network identifier with the user/purchaser. In some embodiments, the configuration can include configuring the article with the user's stored WiFi network passwords and/or Bluetooth pairings etc. In some embodiments, this checkout process can happen automatically or with assistance. For example, the user/purchaser can carry the article through a purchasing area which could cause the event detection system to send a message to a server with the network/article identifier. The server can then receive the network/article identifier and associate it with the user identifier that can be within the same message.

In some embodiments, the receiver/user can make the assignment. For example, the user can assign the event detection system 100 to themselves by scanning a bar code, scanning a QR code, imputing an activation code into a web site, etc. This can enable users to transfer ownership and association of the event detection system 100 without requiring complicated processes involving a third party. For example, if the event detection system 100 were within a toaster, there can be a numeric code that is visible on the bottom of the toaster that is only visible after removing the toaster from the packaging. Thus configured, a transfer of ownership would enable a new owner to see the numeric code and assign the toaster to the new owner.

In some embodiments, a network identifier can be assigned to another user for a temporary period of time. For example, a user can allow a friend to borrow their car for a day. Assignment of the event detection system 100 could last during the duration specified and then revert back to the original user.

In some embodiments, assignment of network/article identifiers to users can be recorded in a centralized server or in a distributed network via a "consensus" as is done with many distributed digital currencies.

In some embodiments, the event detection system has an identifier that is provided to the user. For example, the identifier can be included in packaging for the product. Alternatively, the product can be configured to communicate with a mobile device of the user via a near field protocol, such as NFC, and to be bound by an identifier set by the user. In some such embodiments, after receipt 1000 of the article the user can enter 1002 the article identifier/credentials included in the article into the client device. The user is then authenticated by an article operating server 206 by use of the credentials 1004. If the user is authenticated 1006, the user is then granted authorization 1008 to control the article, including rights to receive data from sensors 103 and control outputs 110. In some embodiments, the user is granted authority to remotely monitor and operate the article via the client 210. In some embodiments of the present technology, after authentication of the user, the user can transfer authority 1010 to operate the article to a third party. In some such embodiments, such transfer can be effectuated through a third party login/authorization system (such as, by way of example but not limitation, Facebook Connect; other alternatives will be readily apparent to those skilled in the art) and the article identifier database 204 is updated with the credentials for the third party 1012.

5) Interchange Entities

The technology can further involve an interchange entity receiving the message and recording the occurrence of the event at the location it occurred. The interchange entity can also provision article identifiers for tracking articles. Similarly, the interchange entity can acquire bulk bandwidth for communicating over the telecommunication network and can provision articles with network identifiers associated with a portion of the bandwidth to allow the telecommunication network to permit messages to be sent to the operating servers.

In some embodiments of the present technology, the functions and systems described above can be performed or operated, as applicable, by different entities. For example, one or more articles including an event detection system can be sent by or on behalf of one or more issuers to the end users. An issuer can utilize an interchange entity, such as for example, a telecommunications network provider, Mobile Virtual Network Operator (MVNO), a legacy network, such as a pager communication network, postal service, mail courier, retailer (storefront or online), delivery service, and the like for functions associated with the articles. In some such embodiments, the interchange is responsible for operating the operation servers 206. In some embodiments, the interchange creates, operates and maintains the article identification databases 204. In some embodiments, the interchange is responsible for the procurement of bandwidth from one or more telecommunications services providers of the telecommunications systems e.g., when the communications servers are operated by the telecommunications services providers. In some embodiments, as depicted in FIG. 2, the article identifier database 204 is operated by the telecommunications services provider. Also, the article identifier database 204 can be operated by the interchange, as shown in FIG. 3. Identifiers for the applicable issuer and interchange can be included in the communication interface 104.

In some embodiments, the interchange utilized for an article 101 is responsible for routing communications from the article to the appropriate issuers via the network/article identifier. In some such embodiments, upon receiving or exchanging messages from or with an article, the interchange updates billing records associated with the issuer, or accounts payable to the telecommunications services provider. In some embodiments, the operation servers 206 can be operated or accessed by the issuer, and communications between the issuer and the articles are routed by the interchange to the appropriate telecommunications services provider by reference to the article/network identifiers. In some embodiments, an issuer can utilize different interchanges for communications with different articles or different types of articles. For example, an issuer can communicate with articles via different interchanges which are selected or determined based upon the geographical destination of the article or location of the intended user/consumer. Alternatively, interchanges can be selected or determined based on the bandwidth required for communication with the applicable article, the type of communications to be conducted with the articles, or the applications supported by the articles. Those with ordinary skill in the art having the benefit of this disclosure will readily appreciate that other a wide variety of criteria can be used for selection of interchanges.

6) Trigger Events

The method 400 also involves the article communicating 404 with the communication server 202 in response to the event, e.g., via a telecommunications system.

The method 400 involves, upon receipt of communication from the event detection system containing an identifier for the article, the communications server checking the identifier 406 against a local article identification database 204 to authenticate the identification of the article, and establish communication 408 with the article. If the article identifier is not authenticated 410, the communication is dropped. For example, if the identifier is not authenticated, such identifier can be placed on a blacklist in the local article identification database 204, so that future communications are not received from such article identifier.

Figure 5:
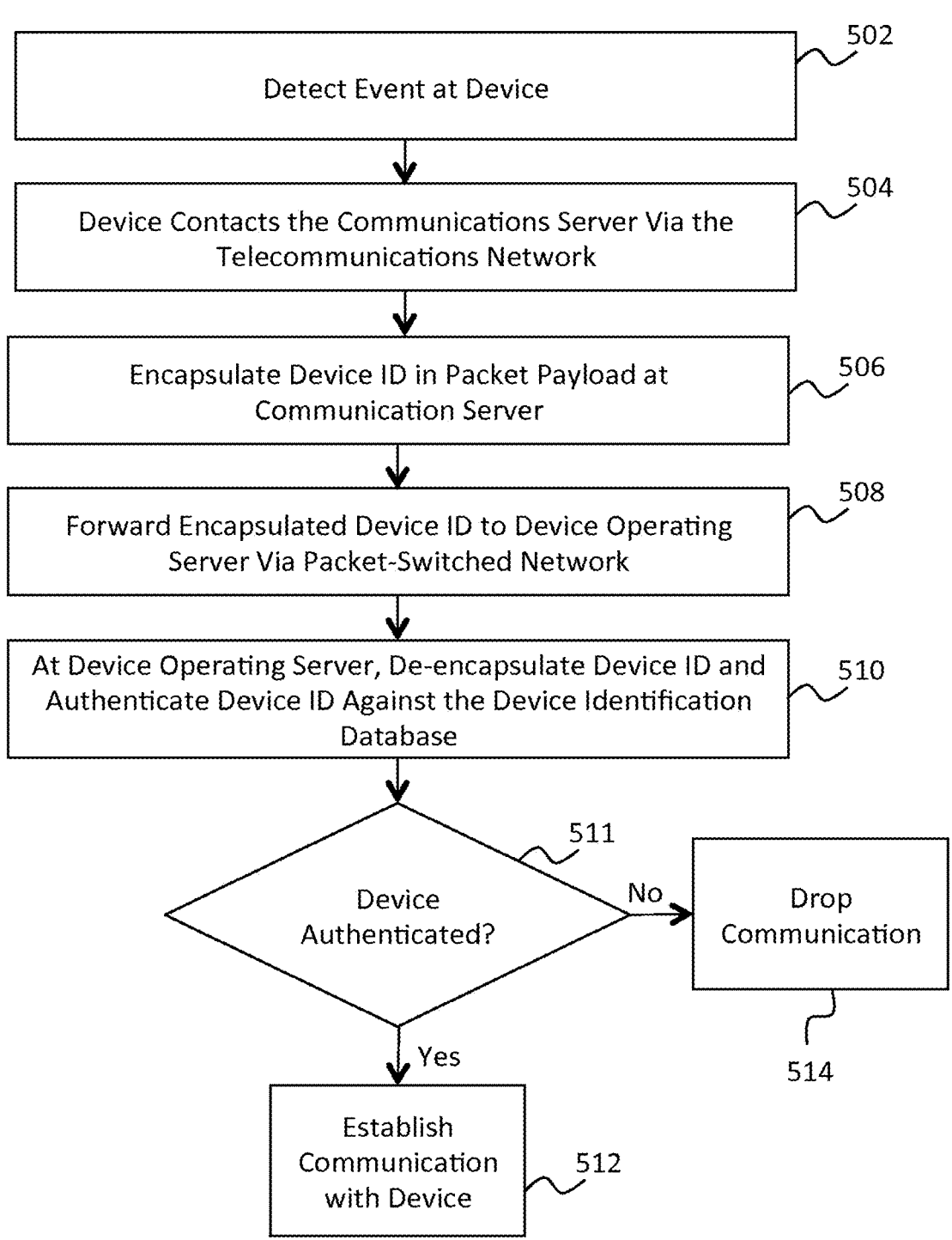
FIG. 5 is a flow chart for establishing communications with the article, in accordance with some embodiments of the present technology.

FIG. 5 illustrates an exemplary method 500 for authenticating an article with an article identification database 204 using an operating server 206 according to some embodiments of the present technology. In some embodiments, after the triggering event is detected 502 at the article, the article establishes communication 504 with the communications server via the communications network. The communications server then encapsulates one or more identifiers received from the article in one or more packet payloads 506. The communications server forwards the encapsulated packets to the operating server via the packet-switched network 508. In some embodiments, the encapsulated packet is forwarded to the operating server in an encrypted or secure form. In some such embodiments, such communications are conducted using a Secure Socket Layer protocol, and/or by use of the IPSec protocol suite; other alternative security protocols that can be utilized for communications between the communications server and the operating server will be apparent to those skilled in the art.

On receipt, the operating server de-encapsulates the article identifier, and authenticates 510 the article identifier against the article identifier database. Upon authentication, the operating server establishes 512 a session with the article (or alternatively, is now configured to accept and exchange asynchronous messages with the article) over a packet switched protocol, with such messages routed to the article via the communications server 202 and the telecommunications network. In some embodiments of the present technology, subsequent communications between an operating server 206 and the article are conducted over a secure protocol, such as a Secure Socket Layer protocol, IPSec, etc. In some such embodiments, secure communications sessions are established between the article and the device operating server 206, so that such communications are not transparent to the communications servers 202.

In some embodiments of the present technology, after the event detection system 100 has been authenticated, the occurrence of the event 402 is recorded at one or more operation servers 206, and associated with an identifier of the article. In some such embodiments, the operation servers receive and records an identifier for the article 101, one or more identifiers for the event detection systems 100 on the article 101, identifiers for an intended, expected, or authenticated recipient or user of the article 101, the time at which the event 402 occurred, a geo-location for the article 101 at the time of the event 101, as identified automatically through the event detection system 100 (via location parameters determined from the communications system 200, or, in other embodiments, a low-power geo-location system, such as a low-power Global Positing System interface, included in the event detection system 100), a postal address to which the article 101 was sent, purchases or other electronic transactions conducted by interaction with the icons, etc. In some embodiments, such information is stored in one or more databases, which can be relational databases or other distributed databases. In some such embodiments, multiple events and corresponding records are stored and identified with an individual user or physical address.

In some embodiments, following authentication of an article 511, an interchange can elect to decline facilitation of communications between an issuer and the article, based on policies. By way of example but not limitation, such a policy can be based on a geo-location of the device, or a volume of data intended to be transmitted to the device, etc.

In some embodiments of the present technology, the operating server 206 collects and generates reports and/or performs analytics on data received from and about the article. In some embodiments, the operating server 206 sends commands to the article to operate the article. In some embodiments, the reports are delivered by the operating server 206 to the client application 210. In some embodiments, the client application 210 can also provide instructions to operate the article via the operating server 206. In some embodiments, a user of the article can be authenticated and authorized to operate the article and/or receive data from the article via the client 210.

Figure 4:
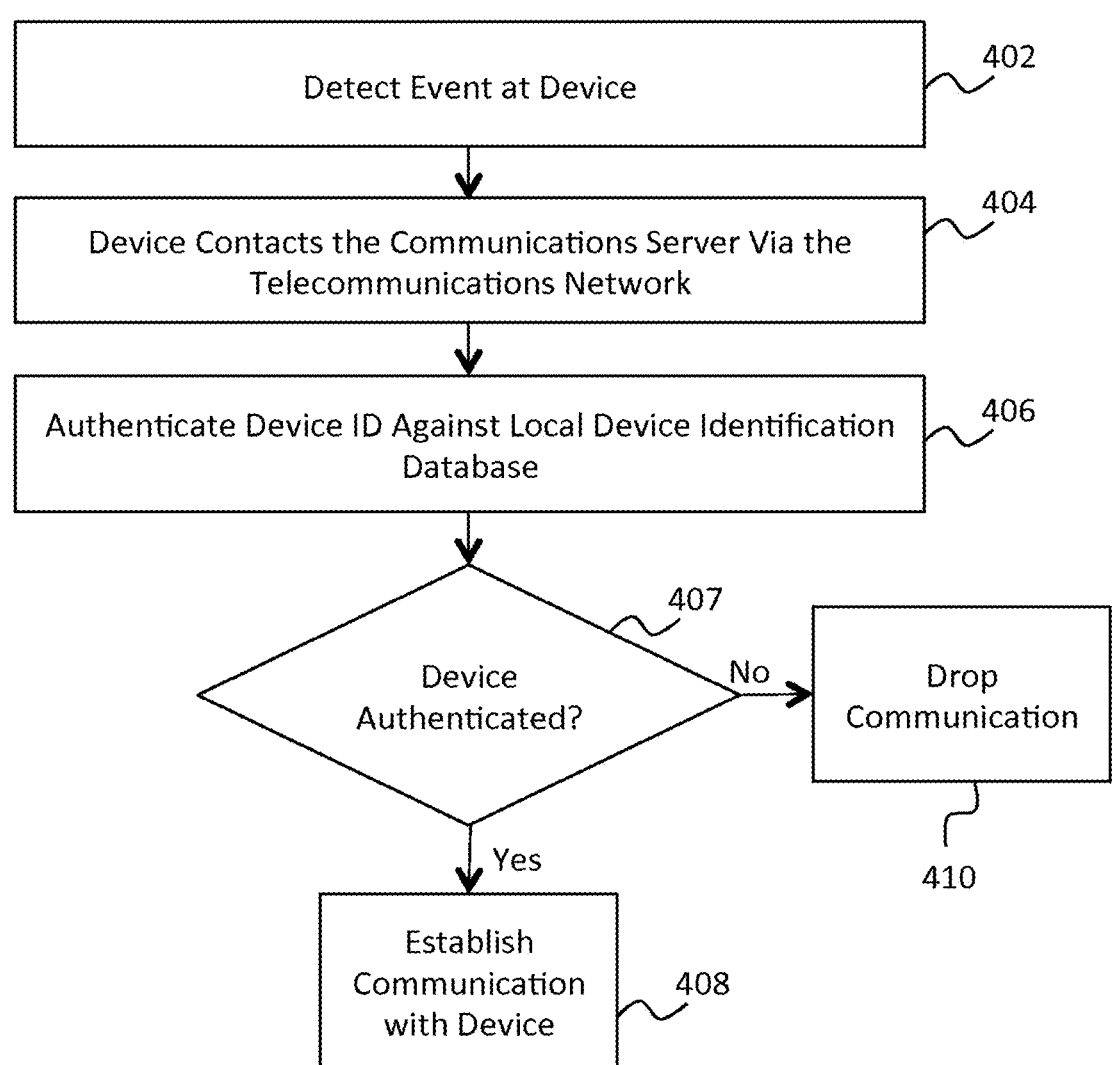
FIG. 4 is a flow chart for establishing communications with the article, in accordance with some embodiments of the present technology.

FIG. 4 illustrates an example for authenticating articles or other articles containing communication interfaces according to some embodiments of the present technology. The method 400 can involve a communication interface 104 detecting an event (e.g., interaction event) at an article 402. By way of example but not limitation, the event can be an initial detection that a threshold of energy has been received at the power source 102, or that another event has been detected at a sensor 103 separate from the power source 102. As a non-limiting example, the power source 102 can be a photo-diode, and the processor 108 can be initially configured in a sleep state, and subsequently enclosed or embedded in an enclosed article, such as an envelope or cardboard box. The processor 108 can be configured to wake when a power source 102 reaches a certain threshold of energy, such as, by way of example but not limitation, a certain luminosity arriving at the photo-diode by virtue of the enclosure being opened by an end user, or a certain current or voltage threshold being received or produced at the power source 102.

Alternatively, the event detection system 100 can be charged initially with power, and can be configured to periodically poll one or more ports or sensors 103 in order to determine if an event has occurred, such as the breaking of a circuit. As an illustrative, non-limiting example, the event detection system 100 could be enclosed in an article such as an envelope or box, and the event could be the breaking of a circuit, for example, when the enclosure is opened. Other examples of such triggering events will be apparent to those skilled in the art.

7) Example Embodiments

As will be apparent to those skilled in the art, the articles described herein can constitute a consumer device, such as an LED or other light bulb or fixture, disposables such as bottles or other containers for food products, liquids, toiletries, or other replenishables or perishables, off-the-shelf sensors such as temperature sensors or light sensors, automotive goods such as tires, batteries, or auto parts; additional examples are too numerous to mention, but will be readily apparent to those skilled in the art. Certain such media, or goods, have states to be monitored by either the user via a client 210, or by a vendor or other entity in communication with the article and event detection system 100 via an operating server 206.

In some embodiments of the present technology, an article is monitored automatically and remotely via an operating server, without requiring provisioning or other manual intervention by the user. For example, an article can be a medicine bottle that is delivered to a user, whereby an event corresponds to detection of an amount of medicine remaining in the bottle. By way of illustration, the bottle can be configured such that multiple measurements, such as weight measurements, or detection of fluid levels, are taken by the event detection system 100, in order to determine robustly that an amount of medication has fallen below a defined threshold, with the multiple measurements taken in order to minimize false-positive results. In some embodiments of the present technology, a delivery of refills for the medication is dispatched to the location of the bottle upon when notification of the threshold is received at the operating server, and a determination is made by the operating server that the result is robust and the medicine has definitively fallen below a designated threshold. For example, the medicine can be an inhaler, and the triggering event can be a determination of pressure in the inhaler, or detection of a certain gas mixture in the inhaler, indicating a need for replenishment. The foregoing information can also be correlated and stored with other medical records of the applicable users. Other examples of such replenishables shall be readily apparent to those skilled in the art.

In some embodiments, the event is an indication that a consumable requires replacement. This event can be a detection of the state of the article or it can be an interactive button whereby a user can indicate the article needs replacement. This can enable a user to purchase an article using the event detection system 100. There are many advantages of using a dedicated connection (i.e., not a user's WiFi/home internet connection). For example, if a user does not want to go through the hassle of configuring the event detection system 100 to connect to their internet, or if it is important that the event detection system works independent of the home connection.

The event detection system 100 can be used in conjunction with an automobile tire, and a triggering event can correspond, for example, to a dramatic pressure drop, and a message is sent by the event detection system 100 to an operating server indicating the drop in tire pressure and a geolocation of the automobile. In some embodiments of the present technology, the power source 102 of the event detection system 100 is a separate power source from the car battery. For example, the power source can derive from heat sources or kinetic sources in the car, or from alternative redundant power sources in the car. In some such embodiments, the geolocation of the event detection system is separate from geolocation systems in the car or otherwise. For example, the geolocation data can be inferred from telecommunications networks 200 by which the event detection system 100 communicates. In some embodiments of the present technology, upon detecting a failure of the tire and receiving the geolocation of the automobile, an operating server can automatically dispatch service to the location of the event detection system 100. As will be apparent to one skilled in the art, the present technology can be similarly utilized for event detection system 100 included in an automobile battery, where the triggering event corresponds to a voltage indicating a battery failure. Other examples will be readily apparent to those skilled in the art.

In an embodiment of the present technology, the event detection system 100 is embedded/attached to a mobile device, such as a cellular phone, laptop, tablet, etc. In some such embodiments, the event detection system 100 can embedded on such device in a manner that is inconspicuous, or that cannot be detached physically from the device without destruction/mutilation of the device. In some such examples, the event detection system 100 communicates over a wireless telecommunications system 200 that is separate from the antenna and communication interface of the mobile device. In some such embodiments, the event detection system 100 has an ambient power source separate from that of the mobile device, so that the phone periodically reports its location to the operating server 206, separately from the mobile device itself, so that its location can continue to be tracked in case the mobile device itself is wiped or runs out of power.

In some embodiments, the event detection system 100 is a medical device to monitor vitals of a patient. For example, the event detection system 100 can monitor a patient's blood sugar level, oxygen level (i.e., through pulse oximetry), or end tidal CO2 (the emitted carbon dioxide levels of a patient. In some embodiments, the event detection system 100 is in a pill form that is passed through the gut and records data as it passes through a patient's system, wirelessly communicating the data to an external device.

In some embodiments, the event detection system 100 comprises an NFC detector that can be embedded in the skin of the user. For example, a user could have an NFC detector in their hand which would enable the user to place their hand on an object to read an NFC chip in the object. The NFC detector can also transmit data. For example, instead of tapping a NFC card on a reader to authenticate a user and provide them access to a building, the user can place their hand on the reader for authentication.

In some embodiments, the event detection system 100 features a microphone and a speaker, thus enabling a user to have an audio connection to another party. This can be useful for customer service purposes, for example if a user has difficulty assembling an item they purchased, they can easily contact customer support for guidance. This can also be useful in emergencies as a direct connection to emergency professionals, similar to dialing "911". For example, a person that fears they may be attached can press a button on event detection system 100 to be connected to police.

In some embodiments, the event detection system 100 can monitor power from a power outlet. In some embodiments, the event detection system 100 has a power source independent of the power outlet. The event detection system 100 can monitor power consumption and the status of the outlet.

Figure 10:
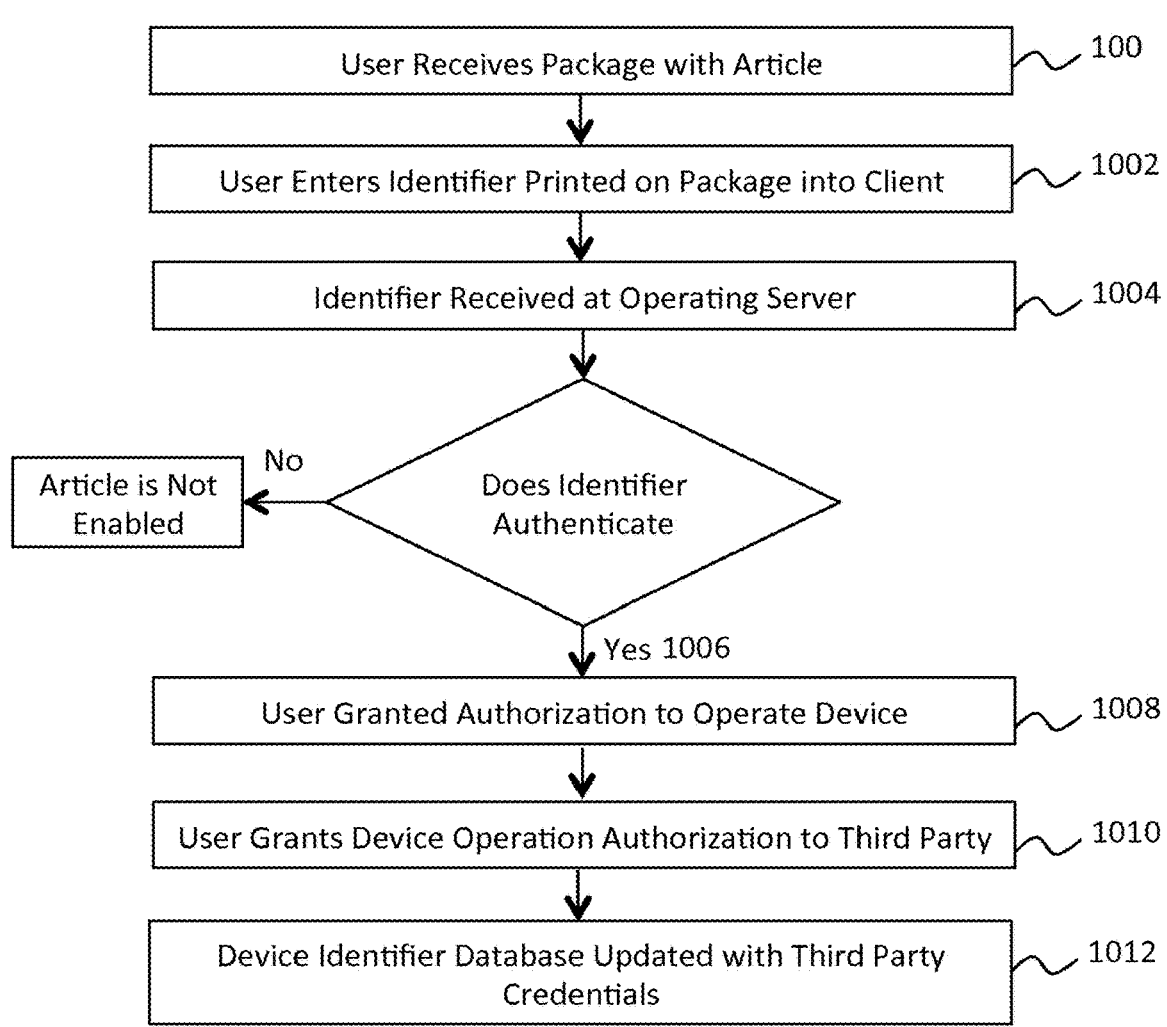
FIG. 10 is a flow chart for obtaining control of an article remotely in accordance with some embodiments of the present technology.

In some embodiments, the event detection system 100 is attached to consumer good articles at the time of production, prior to delivery to stores, as a means of theft detection. By way of example but not limitation, the event detection system 100 can be attached to a consumer article, such as an article of clothing, at the time of manufacture, and provisioned with sufficient bandwidth/"talk-time minutes" on a telecommunications network to send its location to the operating server 206 for a period of time that is substantially longer than the expected sales cycle for the consumer good. On initial receipt of a location that is outside of the permitted stores to which the consumer good can be delivered, the operating server can check a database to determine whether or not the article has been sold. If the article has not been sold, a theft alert is generated. Alternative data flows for fraud detection will be apparent to those skilled in the art. In some embodiments of the present technology, an article, article, and system are also remotely operable, by the user via the client 210, or by a third party via an operating server 206, as further depicted in the flowchart in FIG. 10

For example, when the article is an electronic device, the user can reduce a luminosity of the device remotely via a client. As another example, the article can be a thermostat, and the user can obtain authorization to obtain data from the thermostat and operate the thermostat remotely after authentication using codes on the article that are submitted to the article operating server by the user. Other examples/embodiments of such remote authentication and operation of article and articles will be readily apparent to those skilled in the art.

Figure 6:
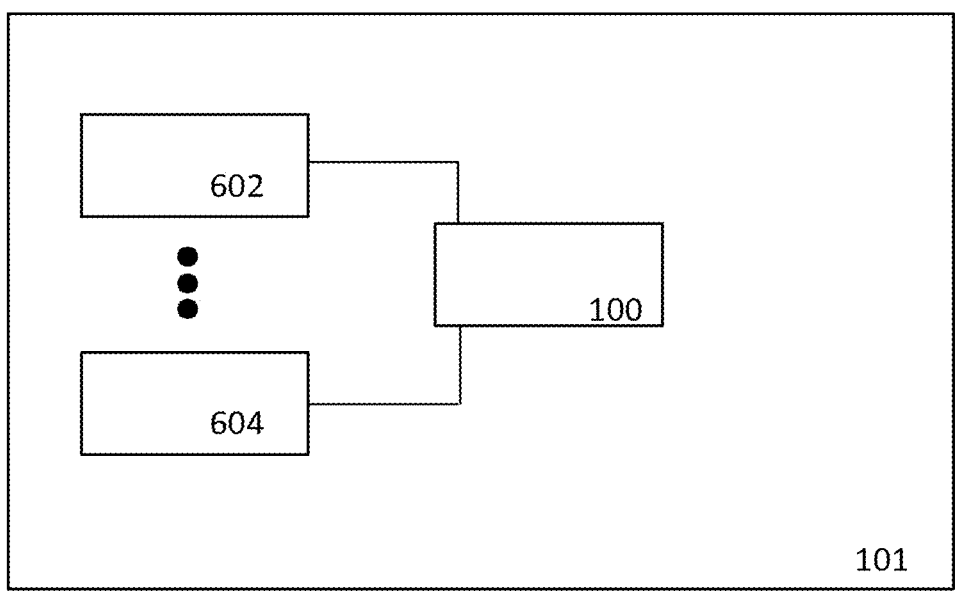
FIG. 6 schematically illustrates coupling between icons on an article and one or more event detection systems, in accordance with some embodiments of the present technology.

In some embodiments, the article can be wearable by a user. By way of example but not limitation, an article can constitute a button embedded into clothing or jewelry, whereby, by pressing the button, a call is immediately placed to an emergency number. In some such embodiments, the user can communicate with the emergency responders audibly, through a microphone/speaker in communication with the event detection system. In some such embodiments, the call is placed directly via the cellular network 200. In other embodiments, a call center talks to the emergency responders based on data delivered from the article. As depicted in FIG. 6, an article 101 can have one or more printed icons/sensors 602, 604 that are in communication with one or more event detection systems 100 embedded in the article 101. In some such embodiments, an event is triggered by breaking or completing a circuit by virtue of the user interaction. For example, the event detection system 100 can be configured so that, by virtue of touching the icon 602, 604, a circuit between the power source 102 and the remainder of the event detection system 100. In other embodiments, the event detection system 100 includes touch detection at the icon 602, 604. In other embodiments, the event 402 corresponds to detection of light from the opening of an enclosed article, such as an envelope or box. Many alternative embodiments will be apparent to those skilled in the art.

The processor 108 can be configured to operate the communication interface 104, in response to events detected by the event detection system 100. In some embodiments, the power source 102 also serves as a sensor that detects events which are reported to the processor 108. As an illustrative, non-limiting example, the processor 108 can be programmed to detect when a photo detector acts as a power source 102 in the event detection system 100 and receives light at a certain luminosity, and can be configured to send a signal via the communication interface 104 in response. In alternative embodiments, the event detection system 100 includes a sensor 103 that is separate from the power source 102, wherein the sensor 103 is in communication with the processor/microprocessor 108, and the processor/microprocessor 108 is operative to poll and respond events detected at the sensor 103.

In some embodiments of the present technology, the event detection system 100 is utilized to measure and track the interaction of the user with an article or article. In some such embodiments, the event 402 is a proxy indicating an interaction of the user with the article or article. By way of example but not limitation, the event 402 can indicate that the user touched an icon on the article 101, such as, by way of illustrative example but not limitation, a printed "button" on the article 101. In some such embodiments, the articles 101 and icons 602, 604 include marketing or promotional literature or materials. Some such embodiments are utilized for tracking the responses of users to marketing or advertising campaigns. By way of example but not limitation, events recorded in some embodiments of the present technology include measuring the opening of envelopes or other articles in response to their contents; the opening or viewing of printed pages (e.g., views of a magazine advertisement); recording and measuring customer responses such as pushing an icon 602 604, which can be depicted as a "button" or can otherwise indicate that part of an article was touched. In some such embodiments, such data can be used for real-time, or asynchronous off-line optimization of marketing campaigns. In some embodiments of the present technology, a geo-location of the event detection system 100 at the time of the customer interaction is determined; in some such embodiments, such geo-location data is tracked against the databases 204 to determine whether or not the interaction with the event detection system 100 was by the targeted user. Such determinations can be utilized, by way of example but not limitation, to determine or enhance the accuracy of success rates in direct mail applications.

In some embodiments, such information can be used to determine payments to third parties for marketing/advertising on an article, e.g., paying third parties based upon user interactions with the article or transactions conducted via the article. Such analytics can also include, by way of example but not limitation, determination of success rates for direct mail campaigns. In some embodiments, subsets of the articles 101 can be selected to estimate the applicable statistics by statistical sampling. Other examples of analytics made possible by the present technology will be apparent to those skilled in the art.

In some embodiments of the present technology, the event detection system 100 is operable to communicate with a user via a mobile phone application via a short-range protocol (e.g., NFC, Bluetooth, etc.). In some such embodiments, the event can correspond to a determination by the event detection system 100 that the user's mobile phone is within a determined proximity of the event detection system 100. For example, an event detection system 100 can be embedded in an article, whereby the event detection system 100 triggers an event when the event detection system 100 detects via the NFC that a device with a specified identifier is within a distance threshold of the event detection system 100, and the event triggers interaction between the event detection system 100 and the mobile device (e,g, communication of a message from the event detection system 100 to the mobile device via the NFC, for display on the mobile device).

In some embodiments, an article 101 includes two or more components that communicate via an NFC, whereby the event detection system 100 is operative to detect from the NFC signals when such two or more components are physically moved relative to one another. For example, such components can be located on opposite pages of a magazine, such that an event can correspond to a page of the magazine being turned. Alternatively, one such component can be on a detachable part of the article and another component is on a non-detachable portion, whereby the event detection system 100 is operative to detect that the applicable portion of the article has been detached. Other such implementations of multiple short-range radio components within an article will be apparent to those skilled in the art.

In some embodiments of the present technology, the event detection system 100 is utilized to conduct electronic commerce transactions via the event detection system 100, i.e., the article 101 can constitute a bill or an invoice, e.g., a cable bill or a credit card bill.

For example, an article in the form of a bill for cable television can include an event detection system 100 sent to a user's home, and can include the icons 602, 604 that indicate options to enable a user to select purchases of cable television articles, which are indicated by the icons 602 604. Also, the article 101 can be a credit card bill, and the icons 602, 604 can indicate whether or not the user approves or wishes to dispute individual payments. In another example, an icon 602, 604 on a credit card bill with an event detection system 100 incorporated therein can be used to indicate whether or not a credit card invoice should be deducted from a user's bank account. In other embodiments of the present technology, the article 101 can be an advertisement, for instance, in a publication such as a magazine, which enables the user to purchase advertised items by touching an icon 602, 604. In some such embodiments, the user's credit card information is stored on or is otherwise accessible by one or more article operating servers 206, and purchases are allowed via the icons 602, 604 after the user has been authenticated. In some such embodiments, communications between the event detection system 100 and the device operating servers 206 in connection with the transaction is conducted via encrypted protocols as described above.

As other examples, the articles 101 can be printed take-out/carry-out menus, or containers for food delivery, such as pizza boxes. In some such embodiments, the user can purchase an item for delivery via touching a corresponding icon 602, 604. In some such embodiments, a delivery service is reached via an operating server 206, which receives an electronic message (e.g., an email, SMS, Twitter message, or other such electronic communication) from the event detection system 100 via the Internet. In other embodiments, the event detection system 100 places a telephone call to via the communications network 200 to the vendor. Some such embodiments can include miniature a microphone and/or speaker that attached to or part of the event detection system

100, and is in communication with the processor 108; the microphone/speaker will be operable at the energies provided by the ambient power source 102, and can be inconspicuous in or visually indistinguishable from the article 101. Also, the microphone or speaker is used for vocal communication with the vendor via the communications network 200. In some such embodiments, the transactions and fulfillment occur only after the postal address to which the article 101 was sent has been authenticated against one or more of the geo-location data from the event detection system 100 and/or an identifier for the user or event detection system 100 that has been authenticated in accordance with embodiments of the present technology. In some examples, the purchased item is delivered in response to event, to the authenticated/validated physical/postal address of the article 101.

Embodiments of the present technology support one-way, two-way, or multi-party vocal messages. In some embodiments of the present technology, the user can click on an icon 602, 604, or activate another event via the article, in order to send an audio message to a pre-determined recipient. For example, the recipient can be a vendor or a customer service representative. In some embodiments of the present technology, following occurrence of the event, and provided that sufficient power is available from the power source 102, a message is recorded from the user via the microphone on the article 101. In some embodiments, this message is stored at the microprocessor 108 and/or communications processor 104 until there is sufficient power from the power source 102 to send the message via the communications system 200. In some embodiments, the message is sent via the telecommunications system 200 automatically after recording.

In some embodiments, the event establishes direct communication with the recipient via the communications network 200 in real-time, without intermediate storage. In some embodiments, the message from the user is forwarded to the recipient as an electronic message, such as an email, SMS, Twitter message, or other similar asynchronous electronic message. In some embodiments, the message is forwarded telephonically. In some embodiments, the communication interface 104 in each of several articles 101 sent to different recipients can be pre-loaded with a call-in number of other identifier for a conference call, so that the recipients can establish and/or join the conference call via the telecommunications network 200 by clicking on the icon 602, 604 or through another event at the article. In some embodiments of the present technology, prior to delivery of the article to the end user, charges for expected use of the telecommunications network 200 by the event detection system 100 have been pre-paid.

In some embodiments of the present technology, an article is mailed to the user and the user is informed (via text on the article) that an event triggered by the user will indicate an assent by the user to a transaction. By way of illustrative example but not limitation, the text can state that the user will be charged for or will otherwise reimburse the postage or other delivery costs for the delivery of the article 101 to the user in the event of the user opening of the article, touching a corresponding icon 602, 604, etc. In some embodiments of the present technology, a message indicating that the user has assented to the charge is sent by the event detection system 100 to the operating server 206, and the user is then charged separately. In other embodiments, upon the occurrence of the event, the user is automatically charged for the reimbursement, for example, by a charge to a credit/debit card or other on-line account that is previously stored for the user for access by the operating server 206.

In some embodiments of the present technology, an article is physically mailed with prepaid postal or delivery charges for return of the article to the sender. In some such embodiments, an article identifier for the event detection system 100 can be reutilized for the individual user to whom the article was sent, for use in subsequent deliveries to that user. Alternatively, following return of the original article or article, the article identifier can be decommissioned for the original user, and can be returned to a pool of available article identifiers.

In some embodiments, the user can indicate, via interaction with an icon 602 604 or other event, that they are to receive a financial credit or reward on return of the article or article.

In some embodiments, the user can indicate, via the icon 602 604 or other event at the article, that the article is to be collected, and a messenger can be dispatched to the user's location or postal address to collect the article 101 in response. Other variants for arranging return of an article via the event detection system 100 will be apparent to those skilled in the art.

Figure 7:
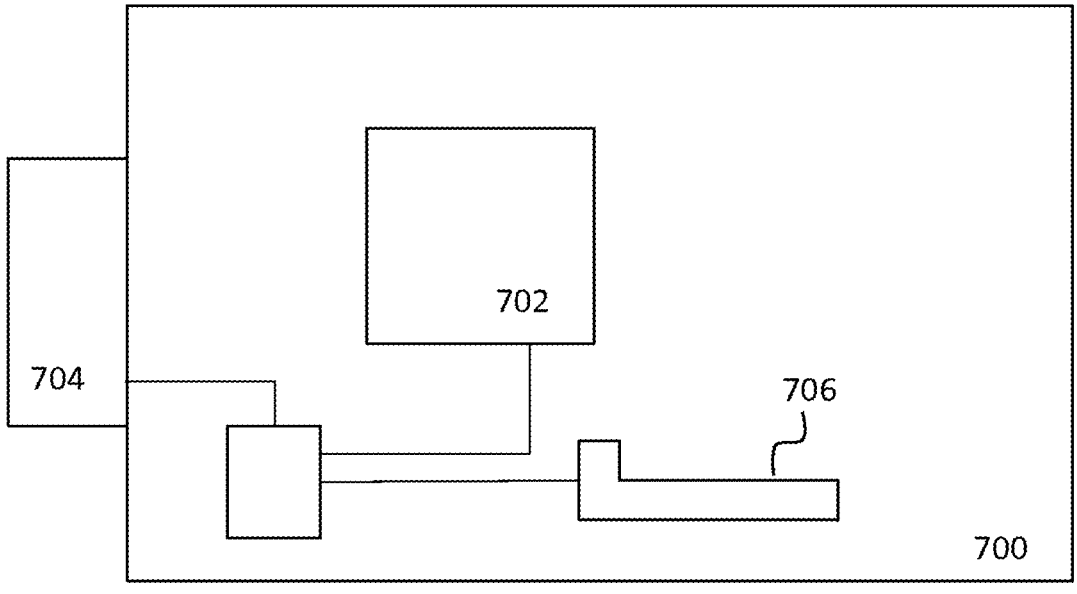
FIG. 7 schematically illustrates a device for providing digital content to a user in lieu of live streaming, in accordance with some embodiments of the present technology.

Embodiments of the present technology comprise a storage device that includes a high-speed wireless cellular connection, whereby the storage device is preloaded with user content, and the device is configured to release the user content by way of the cellular connection. Such embodiments are depicted schematically in FIG. 7. In some embodiments of the present technology, the device 700 can be in a small form factor, such as a key fob or memory stick; other suitable form factors will be apparent to those skilled in the art. The device 700 includes one or more high capacity storage media 702, such as, by way of example but not limitation, flash memory. Some embodiments of the present technology include a port 704, which can be utilized for receiving power for the device 700, and/or for transfer of the content resident in the storage media 702 to another device; by way of example but not limitation, the port can be a USB port. The device further includes a cellular communication interface 706. The cellular communication interface 706 can, by way of example but not limitation, be a 4G system, such as LTE or Mobile WiMax; other alternatives will be apparent to those skilled in the art.

Figure 8:
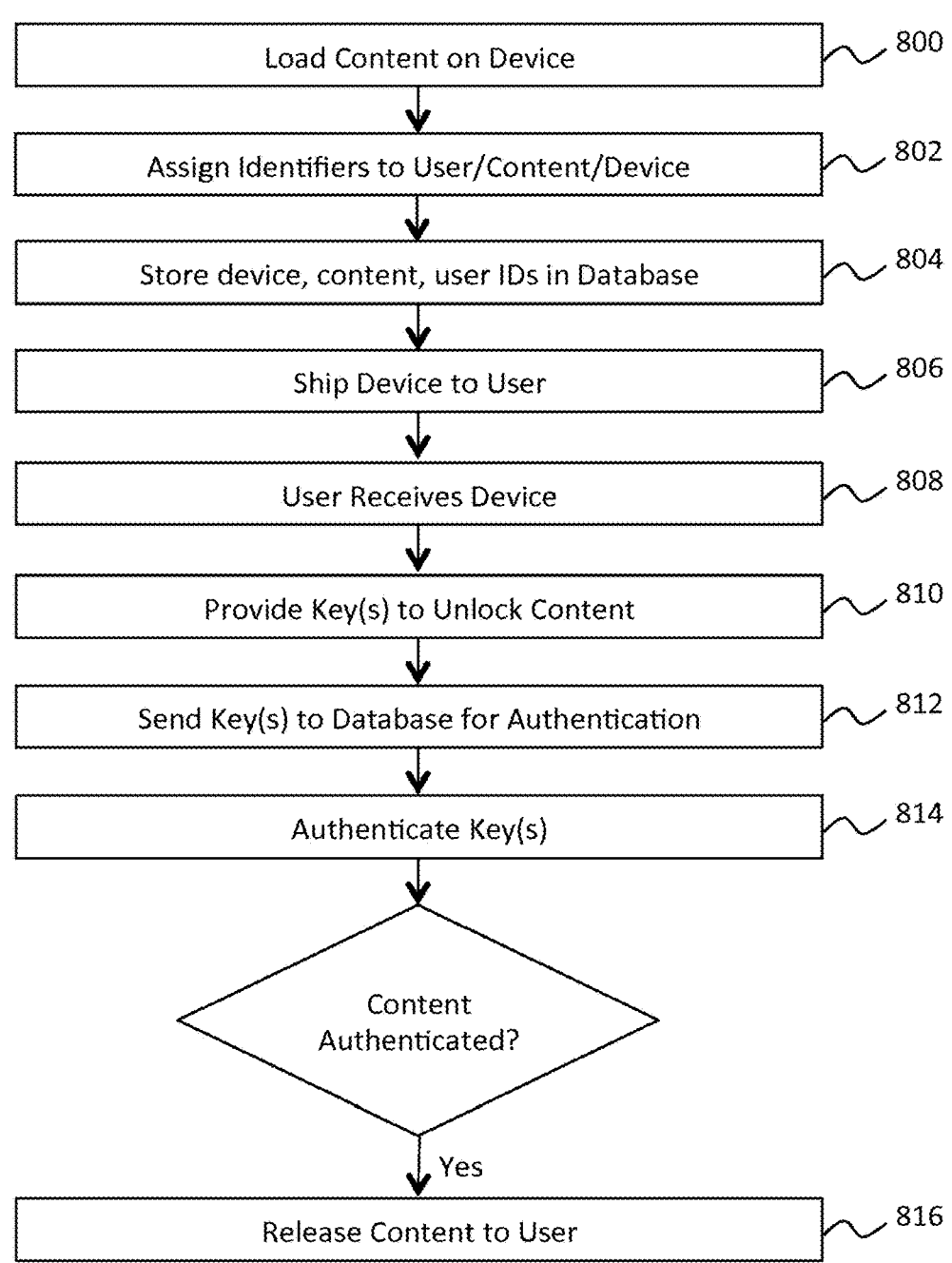
FIG. 8 is a flow chart for provisioning digital content devices, and receiving content from same, in accordance with some embodiments of the present technology.

In some embodiments of the present technology, the device 700 is configured to release content to an individual user, by virtue of one or more user identifiers associated with the user. In some embodiments of the present technology, a user can have content released from the device 700 by provisioning the applicable identifier to the device 700. An example of the provisioning and utilization of the device 700 in accordance with such embodiments is depicted in FIG. 8. At the time of configuration, the device is loaded with one or more pieces of content 800. Such content can be, by way of example but not limitation, movies or other video, songs, books, software, or other digital content that is generally streamed to an end user; other such content which can be delivered to a user by use of the device 700 will be readily apparent to those skilled in the art. As will be apparent to those skilled in the art, remote authentication steps described herein can alternatively be conducted locally on the device 700.

In some embodiments, each such piece of content is associated with an identifier that is unique to the user, the content, and/or the device 802, i.e. public keys. The device, content, and user identifiers are stored in a database 804. The device is then physically shipped to the user 806, associated with a user at the time of purchase or delivery of the device 700 to the user, etc. In some embodiments, the association, or binding, of the identifiers with the device can be conducted via an application running on a user's smartphone, whereby the instance of the application on the user has previously been authenticated. In alternative embodiments, such association/binding of the identifiers with the device 700 occurs at the point of sale, via a point of sale device in communication with the database 204 via the Internet 208.

Following receipt of the device by the user 808, the user can unlock the content on the device by providing the key for the applicable content to the device 810. In some embodiments of the present technology, the key is automatically provided to the device 700 by another device; by way of illustration but not limitation, the ID can be provided by a television in communication with the device via the port 704 or the communication interface 706. The key is sent by the device to a central server via the telecommunications system 812. The key is authenticated by a central server 814, and upon authentication, the central server grants a permission to the device 700 to release the applicable content to the user 816. In some embodiments of the present technology, contents are continually updated to the device by the central servers via the cellular system 706, for potential later retrieval by a user. In alternative embodiments, the communication interface 706 can be a low-bandwidth cellular communications system; in some such embodiments, the communications interface is not utilized to update content to the device.

In certain some embodiments, the devices are physically returned by the user to receive new content, whether loaded on the same device 700 or sent to the user in a new device 700. Embodiments of the present technology include additional security measures for accessing or releasing content from a device 700.

In some embodiments of the present technology, in addition to authentication of the user/device/content identifiers, the geo-location of the device is determined, and the content is only released if the geo-location is approved for such device/content. In some embodiments of the present technology, such geolocation authentication is conducted at the remote database 204; in alternative embodiments, the geo-location authentication is performed locally on the device 700. In some embodiments, the geo-location is performed using telecommunications system on the device 700. In alternative embodiments, the geo-location or alternative authentication utilizes short-range radio communications to a user's mobile device; examples of short-range radio protocols that can be used for such location include, by way of example but not limitation NFC, Bluetooth, RFIDs, beacons; etc. In other embodiments, the supplemental security measure can include biometric identification of the user by the device 700.

Embodiments of the present technology utilize the information collected from a user via an article 101 to personalize on-line, Internet and mobile-based content to such user; such customization can be conducted off-line or in real-time with the data received via the article 101. For example an online identifier of the user which identifies the user's activities on the World Wide Web or elsewhere on the Internet (such as a persistent identifier stored in a cookie, login usernames for on-line services, mobile phone numbers, or other such on-line identifiers as will be apparent to those skilled in the art) can be correlated with identification of the article in the device identification database 204. Web-based content can be customized for the user based on the data recorded about such user from a triggering event and their other interaction with the event detection system 100. By way of example but not limitation, advertisements or other web-based or mobile content can be selected or customized for the user based on magazine contents that have been viewed by the user, as detected by the event detection system 100 and reported to the operating server 206.

Alternatively, emails, texts, Twitter messages, or other such electronic messages can be sent to a user based on their interaction with the article or article, as detected and communicated by the event detection system 100. By way of example but not limitation, a user can be sent a thank you note following interaction with the event detection system 100. The article 101 can also be used by the end user (actively or passively) to update other records and workflows. By way of example but not limitation, health or insurance records of a user could be updated by way of the user's interaction with the event detection system 100.

In some embodiments of the present technology, analytics can be conducted on data sets contained in the database 204 which combine data from the users' on-line activities (e.g., their Web usage) with data regarding such users' interactions with article or articles. For example, the fees charged to advertisers can be based upon delivery or response to Web or mobile based ads served to users as well as response rates from such users to paper-based advertising, as the latter is detected and reported by the event detection system 100. Other examples of integration of feedback of the event detection system 100 with user interactions via separate electronic media will be apparent to those skilled in the art.

In some embodiments of the present technology, the output 110 can be coupled to sensors 103 such as a camera that is operable at the power provided by the supply 102. In some such embodiments, the event detection system 100 is operable to take a picture of the user via the camera 103 when the user opens the article, and then transmit the picture over a wireless network 200. In some such embodiments, the picture is at a low-resolution, transmittable over low-baud rate networks. In some embodiments, the picture can be utilized to authenticate the user, or provide proof that the individual opened the article. For example, for confirmation of service of process. Other uses and variants of such a camera will be readily apparent to those skilled in the art.

Some embodiments of the present technology include mechanisms for wirelessly detecting the presence of an article in the vicinity of the detection mechanism, in order to detect the presence of such a mechanism. In some such embodiments, the wireless detector checks for signature wireless transmissions in the vicinity that confirm the presence of an article or article. Such detection can be used by an individual to elect to dispose or destroy an article or article, or to open an article in an area that cannot transmit wireless signals (e.g., a Faraday cage).

In some embodiments of the present technology include an application programming interface (API) that allow interactions with the event detection system 100 to be programmed or re-programmed. By way of example but not limitation, the API can allow the interactions from icons 602 604 to be programmed or reprogrammed, and result in different workflows. For example, the API can be utilized to program the event detection system 100 such that differing sequences of interactions with the icons 602, 604 result in different workflows being determined by the device operating servers 206. As another illustrative example, the icons 602, 604 can have the visual effect of numbers on a keypad, and the API can be utilized in a first instance to allow the entry of certain numbers to lock or unlock a remote device that is in communication with the operating servers 206; the API can subsequently utilized in an alternative program/instruction set that can be uploaded to the event detection system 100 via the telecommunications network 200, whereby the revised instructions allow the user to operate an alternative device via the telecommunications network 200. Many other examples of work flows that can be programmed by use of the API in accordance with the present technology will be readily apparent to those skilled in the art.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that can be made to the principles described herein without following the example embodiments and applications illustrated and described herein, and without departing from the spirit and scope of the disclosure.

We claim:

1. A method comprising:

detecting a plurality of interaction events at a communication system coupled with an article, wherein the communication system comprises a microcontroller comprising a communication interface coupled with a sensor;

detecting a first interaction event with the article at a first geographic location, wherein the first interaction event triggers a communication with the article to receive an article identifier and a status of the article associated with the first interaction event, the status of the article being associated with one or more states of the article that are associated with detection of whether contents of the article are below a threshold;

detecting a second interaction event with the article at a second geographic location remote from the first interaction event, wherein the second interaction event includes initiation of the detection of the one or more states of the article that triggers a communication indicating a remedial action associated with the one or more states to resolve the first trigger event and the contents being below the threshold;

authenticating, at a second geographic location, the article through the article identifier based on an authentication policy associated with the first location of the interaction event; and permitting remote control of the article at the second geographic location in accordance with the remedial action based on the authentication of the article identifier, wherein the remote control at the second geographic location includes returning the contents of the article above the threshold and wherein the remedial action is automatically triggered based on the authentication policy.

2. The method of claim 1, wherein the communication is triggered upon a predetermined threshold of the interaction event being met at the article.

3. The method of claim 1, wherein the first interaction event and the second interaction event are detected by the sensor of the communication system.

4. The method of claim 1, wherein the authentication policy is based on a geo-location of the article, or a volume of data intended to be transmitted to the article.

5. The method of claim 1, wherein authenticating the article when a predetermined threshold is met is based on the authentication policy considering a location of the article and a nature of the interaction.

6. The method of claim 1, wherein authenticating the communication from the remote second geographic location is performed remotely without being directly connected to an interaction event.

7. The method of claim 1, wherein authenticating the article based on the authentication policy comprises:

validating the article identifier of the article against a local article identification database to authenticate the identification of the article; and establishing communication with the article based on the validation of the authentication policy.

8. The method of claim 1, wherein the communication system facilitates communication with the articles via a plurality of communication interchanges, the communication interchanges selected based on a geographical destination of the article.

9. The method of claim 1, wherein permitting a third party to remotely manage the article is effectuated through the article remotely receiving a plurality of authentication codes from the third party.

10. The method of claim 1, further comprising:

granting authorization to a third party to receive data from the sensors and one or more control actuators affixed to the article related to interaction events at the first geographic location.

11. A system for controlling an article coupled with a communication system including a sensor for detecting an interaction event with the article, the system comprising:

a microcontroller coupled with the sensor, and a communication interface coupled with the microcontroller;

one or more processors; and at least one computer-readable storage medium having stored therein instructions which, when executed by the one or more processors, cause the one or more processors to perform operations comprising:

detecting a plurality of interaction events at a communication system coupled with an article, wherein the communication system comprises a microcontroller comprising a communication interface coupled with a sensor;

detecting a first interaction event with the article at a first geographic location, wherein the first interaction event triggers a communication with the article to receive an article identifier and a status of the article associated with the first interaction event, the status of the article being associated with one or more states of the article that are associated with detection of whether contents of the article are below a threshold;

detecting a second interaction event with the article at a second geographic location remote from the first interaction event, wherein the second interaction event includes initiation of the detection of the one or more states of the article that triggers a communication indicating a remedial action associated with the one or more states to resolve the first trigger event and the contents being below the threshold;

authenticating, at a second geographic location, the article through the article identifier based on an authentication policy associated with the first geographic location of the interaction event; and permitting remote control of the article at the second geographic location in accordance with the remedial action based on the authentication of the article identifier, wherein the remote control at the second geographic location includes returning the contents of the article above the threshold and wherein the remedial action is automatically triggered based on the authentication policy.

12. The system of claim 11, wherein the communication is triggered upon a predetermined threshold of the interaction event being met at the article.

13. The system of claim 11, wherein the first interaction event and the second interaction event are detected by the sensor of the communication system.

14. The system of claim 11, wherein the authentication policy is based on a geo-location of the article, or a volume of data intended to be transmitted to the article.

15. The system of claim 11, wherein the authenticating the article when a predetermined threshold is met is based on the authentication policy considering a location of the article and a nature of the interaction.

16. The system of claim 11, wherein the authenticating the communication from the remote second geographic location is performed remotely without being directly connected to an interaction event.

17. The system of claim 11, wherein authenticating the article based on the authentication policy comprises:

validating the article identifier of the article against a local article identification database to authenticate the identification of the article; and establishing communication with the article based on the validation of the authentication policy.

18. The system of claim 11, wherein the communication system facilitates communication with the articles via a plurality of communication interchanges, the communication interchanges selected based on a geographical destination of the article.

19. The system of claim 11, wherein permitting a third party to remotely manage the article is effectuated through the article remotely receiving a plurality of authentication codes from the third party.

20. The system of claim 11, further comprising:

granting authorization to a third party to receive data from the sensors and one or more control actuators affixed to the article related to interaction events at the first geographic location.

* * * * *